(12) United States Patent
Okada et al.

(10) Patent No.: US 9,902,429 B2
(45) Date of Patent: Feb. 27, 2018

(54) AUTOMOBILE STRUCTURAL MEMBER AND MANUFACTURING METHOD OF THE SAME

(71) Applicant: NIPPON STEEL & SUMITOMO METAL CORPORATION, Tokyo (JP)

(72) Inventors: Tohru Okada, Tokyo (JP); Masanori Yasuyama, Tokyo (JP); Teruki Sakamoto, Tokyo (JP); Takashi Imamura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 384 days.

(21) Appl. No.: 14/772,537

(22) PCT Filed: Apr. 4, 2014

(86) PCT No.: PCT/JP2014/060025
§ 371 (c)(1),
(2) Date: Sep. 3, 2015

(87) PCT Pub. No.: WO2014/163203
PCT Pub. Date: Oct. 9, 2014

(65) Prior Publication Data
US 2016/0016610 A1 Jan. 21, 2016

(30) Foreign Application Priority Data
Apr. 4, 2013 (JP) .................................. 2013-078835

(51) Int. Cl.
*B62D 21/15* (2006.01)
*B23K 26/22* (2006.01)
(Continued)

(52) U.S. Cl.
CPC .............. *B62D 21/15* (2013.01); *B23K 26/22* (2013.01); *B23K 31/02* (2013.01); *B62D 25/00* (2013.01);
(Continued)

(58) Field of Classification Search
CPC ...... B62D 21/15; B62D 29/008; B23K 26/22; B23K 31/02; B23K 2201/006
(Continued)

(56) References Cited

U.S. PATENT DOCUMENTS 6,217,089 B1 4/2001 Goto et al.
8,124,908 B2* 2/2012 Komaki ................ B23K 26/22
219/121.6
(Continued)

FOREIGN PATENT DOCUMENTS

CN 1765534 A 5/2006
CN 101691125 A 4/2010
(Continued)

OTHER PUBLICATIONS

Japanese Office Action dated Dec. 27, 2017, issued in corresponding Japanese Patent Application No. 2015-510164.
(Continued)

*Primary Examiner* — Samuel M Heinrich
(74) *Attorney, Agent, or Firm* — Birch, Stewart, Kolasch & Birch, LLP

(57) ABSTRACT

An automobile structural member (2) has a closed transverse section shape constituted with a first composing member (12) and a second composing member (13). The first composing member (12) has a vertical wall portion (12c), a bent portion (12b), and an inward flange (12a), and has a load transmission portion (20) formed in at least a part of a region being a region between the bent portion (12b) and the second composing member (13) and being a region of an extension (Continued)

of the vertical wall portion (12c) toward the second composing member (13) and which joins the bent portion (12b) and the second composing member (13). Thereby, a bending and crushing performance can be improved.

11 Claims, 9 Drawing Sheets

(51) Int. Cl.
    *B23K 31/02*      (2006.01)
    *B62D 29/00*      (2006.01)
    *B62D 25/00*      (2006.01)
    *B62D 25/04*      (2006.01)
    *B23K 101/00*    (2006.01)
    *B62D 25/02*      (2006.01)

(52) U.S. Cl.
    CPC ......... *B62D 29/007* (2013.01); *B62D 29/008* (2013.01); *B23K 2201/006* (2013.01); *B62D 25/025* (2013.01); *B62D 25/04* (2013.01)

(58) Field of Classification Search
    USPC ........ 219/121.64, 137 R; 29/897.2; 228/178, 228/182; 293/155
    See application file for complete search history.

(56) References Cited

U.S. PATENT DOCUMENTS

| | | | |
|---|---|---|---|
| 2003/0184075 A1 | 10/2003 | Freeman et al. |
| 2006/0103168 A1 | 5/2006 | Ueno et al. |
| 2009/0243337 A1 | 10/2009 | Ema et al. |
| 2010/0310897 A1 | 12/2010 | Takaki et al. |
| 2013/0062912 A1 | 3/2013 | Zornack et al. |
| 2014/0084634 A1 | 3/2014 | Suzuki et al. |

FOREIGN PATENT DOCUMENTS

| | | |
|---|---|---|
| CN | 102151954 A | 8/2011 |
| CN | 202463922 U | 10/2012 |
| CN | 102883940 A | 1/2013 |
| CN | 102909479 A | 2/2013 |
| JP | 56-067110 | 6/1981 |
| JP | 11-152541 A | 6/1999 |
| JP | 2000-33477 A | 2/2000 |
| JP | 2003-054445 A | 2/2003 |
| JP | 2006-205275 A | 8/2006 |
| JP | 2006-224130 A | 8/2006 |
| JP | 2006-281956 A | 10/2006 |
| JP | 2010-12504 A | 1/2010 |
| JP | 2011-168082 A | 9/2011 |
| JP | 2011-230609 A | 11/2011 |
| JP | 2012-131451 A | 7/2012 |
| SU | 1379177 A1 | 3/1988 |
| WO | 2012/120967 A1 | 9/2012 |

OTHER PUBLICATIONS

Extended European Search Report for corresponding European Patent Application No. 14780360.5, dated Nov. 8, 2016.
Chinese Office Action dated Aug. 2, 2016, issued in corresponding Chinese Patent Application No. 201480017817.8.
Taiwanese Office Action and Search Report for Taiwanese Application No. 103112686, dated Jul. 28, 2016, with a partial English translation.
Office Action dated Feb. 13, 2017, in Chinese Patent Application No. 201480017817.8.
Russian Office Communication and Search Report, dated Nov. 14, 2016, for corresponding Russian Application No. 2015147407.
Japanese Office Action for Japanese Application No. 2015-510164, dated Jun. 7, 2016, with a partial English translation.
Taiwanese Office Action and Search Report, dated Nov. 25, 2015, for corresponding Taiwanese Application No. 103112686, with a partial English translation of the Office Action.
English translation of the International Preliminary Report on Patentability and Written Opinion of the International Searching Authority (Forms PCT/IB/338, PCT/IB/373 and PCT/ISA/237), dated Oct. 15, 2015, for International Application No. PCT/JP2014/060025.
International Search Report issued in PCT/JP2014/060025, dated Jun. 3, 2014.
Written Opinion issued in PCT/JP2014/060025, dated Jun. 3, 2014.

* cited by examiner

AUTOMOBILE STRUCTURAL MEMBER AND MANUFACTURING METHOD OF THE SAME

TECHNICAL FIELD

The present invention relates to an automobile structural member constituting an automobile vehicle body and a manufacturing method of the same. Concretely, the present invention relates to an automobile structural member having a closed transverse section shape constituted by combining a metal sheet such as a thin steel sheet and a molded body of a metal sheet, for example, and a manufacturing method of the same.

BACKGROUND ART

Among automobile structural members used as skeletal frame members of an automobile vehicle body (body shell) having a monocoque structure, cited as the member on which a three-point bending load is supposed to act at a time of collision accident are a side sill, a bumper reinforcement, a center pillar, and so on.

A high three-point bending load is required of the above automobile structural member (hereinafter, referred simply to as an "automobile structural member) in order to secure a vehicle interior space at the time of collision or in order to transmit an impact load at the time of collision to another automobile structural member efficiently. Further, the automobile structural member itself is required to have an excellent impact absorption performance to three-point bending. In the present specification, the tree-point bending load and the impact absorption performance to the three-point bending which the automobile structural member has are combinedly referred to as a bending-crushing performance. Further, not only the bending-crushing performance but also weight reduction and cross section reduction for the purpose of fuel consumption improvement of an automobile is strongly required of the automobile structural member.

The automobile structural member is assembled, in general, by spot welding a first composing member made of a steel sheet molded into a hat shape in cross section having an outward flange and a closing plate being a second composing member made of a steel sheet, using the outward flange as a welding margin. In the present specification, the member with a hat-shaped cross section which has the outward flange is referred to as a hat member. In other words, the hat member has a hat-shaped transverse section shape made by two outward flanges, two bent portions each connected to the two outward flanges, two vertical wall portions each connected to the two bent portions, two edge line portions each connected to the two vertical wall portions, and one groove bottom portion to which the two edge line portions are connected.

Heretofore, various inventions have been suggested for the purpose of suppressing increase of a weight of a first composing member being a hat member and for obtaining an excellent bending-crushing performance.

Patent Literature 1 discloses an automobile structural member in which a reference range of (R+7) mm is set, with a radius of a bent portion being R, on at least one surface of two surfaces forming the bent portion from a center of the bent portion in a transverse section of a first composing member being a hat member molded by press bending of a steel sheet containing C: 0.05 to 0.3% (in the present specification, "%" related to a chemical composition means "mass %" as long as not mentioned otherwise) and Mn: 0.5 to 3.0%, one or a plurality of quench-strengthened portion(s) is (are) formed along the bent portion in the reference range by laser irradiation or high-frequency heating, and an occupancy ratio of 20% or more in relation to a total reference range length of a total width of the quench-strengthened portion in the reference range is secured for all the surfaces constituting all the bent portions of the first composing member. It is disclosed that according to this automobile structural member an impact crushing resistance can be improved effectively by small formation of the quench-strengthened portion while good press moldability is secured.

Patent Literature 2 discloses an automobile structural member having a barrel unit which has a closed transverse section shape formed by a first composing member being a hat member and a second composing member and in which the first composing member and the second composing member are spot-welded by an outward flange, the automobile structural member being interposed by filling a resin layer in a region sandwiched by a bent portion neighboring the outward flange and the second composing member. It is disclosed that according to this automobile structural member light weight and excellent bending-crushing performance are had.

On the other hand, Patent Literature 3 discloses an automobile structural member made by joining, by laser-welding, inward flanges of two composing members with recessed cross sections to each other, in a manner that bottom surface inner walls thereof face each other. It is disclosed that according to such an automobile structural member changing of a bending load property can increase an energy absorption amount.

CITATION LIST

Patent Literature

Patent Literature 1: Japanese Laid-open Patent Publication No. 11-152541
Patent Literature 2: Japanese Laid-open Patent Publication No. 2011-168082
Patent Literature 3: Japanese Laid-open Patent Publication No. 2003-54445

SUMMARY OF INVENTION

Technical Problem

In order for the first composing member being the hat member disclosed in Patent Literatures 1, 2 to have a high three-point bending load, it is important to suppress deformation of the transverse section shape of the hat member at a time of impact load placement as far as possible and to transmit the impact load efficiently from the second composing member to a vertical wall portion of the first composing member.

Here, when the impact load is transmitted from the closing plate being the second composing member to the hat member being the first composing member, the impact load inputted from a closing plate side is transmitted to the vertical wall portion via the bent portion which inevitably exists between the outward flange and the vertical wall portion of the first composing member. Therefore, the vertical wall portion is apt to be buckle-deformed early, so that the impact load cannot be transmitted efficiently to the vertical wall portion of the first composing member. In other words, in order to improve a bending-crushing performance of an automobile structural member, it is effective to suppress occurrence of buckling deformation of a vertical wall portion at a time of impact load placement.

However, though the invention disclosed in Patent Literature 1 suppresses deformation of the transverse section shape of the hat member by quench-strengthening the bent portion of the hat member being the first composing member, the suppression is not enough to transmit the impact load efficiently to the vertical wall portion. Further, in the invention disclosed in Patent Literature 1, laser irradiation or high-frequency induction heating to the bent portion of the hat member is required to be carried out after the hat member and the closing plate are welded and assembled via the outward flange, and increase in man-hour and cost necessary for manufacturing is inevitable.

Further, since the invention disclosed in Patent Literature 2 suppresses deformation of the vertical wall portion by filling a resin in a region (space) sandwiched by the bent portion neighboring the outward flange of the hat member and the second composing member, a bending-crushing performance can be heightened in some measure. However, in addition to spot-welding the first composing member and the second composing member by using the outward flange as the welding margin, filling of the resin in the above-described region is required, and increase in man-hour and cost necessary for manufacturing is inevitable.

Further, in both inventions disclosed in Patent Literatures 1, 2, in order to use spot-welding for wedding of the first composing member and the second composing member, it is necessary to provide an outward flange of a width of normally about 20 to 30 mm as a welding margin in the first composing member. Since contribution of the outward flange to a bending-crushing performance is small, weight reduction and cross section reduction by curtailment of the width of the outward flange is desired, but neither invention disclosed in Patent Literature 1, 2 can contrive weight reduction and cross section reduction by curtailment of the width of the outward flange.

On the other hand, the invention disclosed in Patent Literature 3 can contrive weight reduction and cross section reduction of the automobile structural member by joining the inward flanges to each other, compared with an outward flange. However, since the inward flanges are joined by laser welding in which welding is carried out by melting an interface, a region sandwiched by the bent portions neighboring the inward flanges still have spaces. Therefore, when an impact load is transmitted to one composing member from the other composing member, the impact load inputted from the other composing member side is transmitted to the vertical wall portion via the bent portion between the inward flange and the vertical wall portion of the one composing member. Therefore, similarly to in the automobile structural member constituted with the hat member disclosed in Patent Literature 1, there is a problem that the vertical wall portion is apt to be buckle-deformed early and that the impact load cannot be transmitted efficiently to the vertical wall portion of the one composing member.

Solution to Problem

Since spot-welding is capable of welding a plurality of overlapped thin steel sheets in quite a short welding time of about 0.1 to 0.5 seconds efficiently and easily, conventionally spot-welding has been widely used for welding of an automobile structural member or an automobile vehicle body, in particular. Thus, in assembling an automobile structural member by welding a first composing member and a second composing member, it has been a technical common sense among those skilled in the art to form an outward flange to be a welding margin in the first composing member and to spot-weld to the second composing member with the outward flange.

As a result that the present inventors have conducted keen examination to solve the above-described problems, it is configured that an inward flange instead of an outward flange is formed in a first composing member, that the first composing member and a second composing member are overlapped via the inward flange, and that, in at least a part of a region being a region between a bent portion continued to the inward flange and the second composing member, the region being an extension of a vertical wall portion toward the second composing member, a load transmission portion joining the bent portion and the second composing member is formed. The present inventors find that, therefore, man-hour and cost necessary for manufacturing can be suppressed to a degree similar to that in a conventional automobile structural member and that a bending-crushing performance of an automobile structural member can be substantially improved from a bending-crushing performance of the conventional automobile structural member, and further conducted keen examination, to complete the present invention.

The present invention will be described as below, when explained with reference to FIG. 1B to FIG. 1D showing an example of a transverse section shape of an automobile structural member according to the present invention and FIG. 2 being a drawing extractingly showing a periphery of a load transmission portion in the automobile structural member according to the present invention.

(1) An automobile structural member 2 to 4 is an automobile structural member 2 to 4 which has a closed transverse section shape constituted with at least a first composing member 12 made of a molded body of a metal sheet and second composing member 13 to 15 made of a metal sheet or a molded body of a metal sheet and joined to the first composing member 12, the first composing member 12 having a vertical wall portion 12*c*, a bent portion 12*b* connected to the vertical wall portion 12*c* and bent toward an inner side of the closed transverse section shape, and an inward flange 12*a* connected to the bent portion 12*b*, and it is characterized in that the automobile structural member includes: a load transmission portion 20 which is formed in at least a part of a region being a region between the bent portion 12*b* and the second composing member 13 to 15 and being a region of an extension of the vertical wall portion 12*c* toward the second composing member 13 to 15, and which joins the bent portion 12*b* and the second composing member 13 to 15.

(2) It is characterized in that when a width of the load transmission portion 20 toward a plate thickness direction of the vertical wall portion 12*c* is indicated as WT and a plate thickness of the vertical wall portion 12*c* is indicated as t, $0.3t \leq WT \leq 1.0t$ is satisfied.

(3) It is characterized in that the load transmission portion 20 is a part of a joining portion 21 filling a part or all of a space 22 formed between the bent portion 12*b* and the second composing member 13 to 15, and that in the joining portion 21 a joining width L being a range in contact with the second composing member 13 to 15 is longer than a width WT of the load transmission portion 20.

(4) It is characterized in that in the bent portion 12*b*, hardness of at least a range which the load transmission portion 20 is in contact with is higher than hardness of a base material of the first composing member 12.

(5) It is characterized in that the load transmission portion 20 is formed intermittently through a longitudinal direction of the automobile structural member 2 to 4.

(6) A manufacturing method of an automobile structural member 2 to 4 which has a closed transverse section shape constituted with at least a first composing member 12 made of a molded body of a metal sheet and a second composing member 13 to 15 made of a metal sheet or a molded body of a metal sheet and joined to the first composing member, the first composing member 12 having a vertical wall portion 12c, a bent portion 12b connected to the vertical wall portion 12c and bent toward an inner side of the closed transverse section shape, and an inward flange 12a connected to the bent portion 12b, it is characterized in that the manufacturing method of the automobile structural member includes: forming a load transmission portion 20 which joins the bent portion 12b and the second composing member 13 to 15 by welding using a filler metal in at least a part of a region being a region between the bent portion 12b and the second composing member 13 to 15, the region being an extension of the vertical wall portion 12c toward the second composing member 13 to 15.

(7) It is characterized in that the load transmission portion 20 is formed by a plurality of welding operations by using the filler metal.

(8) It is characterized in that welding lengths are each different in at least two operations of the plurality of welding operations.

(9) It is characterized in that the load transmission portion 20 is a part of a joining portion 21 filling a part or all of a space formed between the bent portion 12b and the second composing member 13 to 15, that the load transmission portion 20 is formed by a plurality of welding operations by using the filler metal, that in the first welding operation, welding is carried out so that a width WT of the load transmission portion 20 satisfies WT<0.6t and a joining width L being a range in which the joining portion 21 is in contact with the second composing member 13 to 15 satisfies 0<L, and that in the second or later welding operation, welding is carried out so that the width WT of the load transmission portion 20 satisfies $0.6t \leq WT \leq 1.0t$.

(10) It is characterized in that the load transmission portion 20 is formed intermittently through a longitudinal direction of the automobile structural member 2 to 4.

(11) It is characterized in that the load transmission portion 20 is formed by arc welding or laser-arc hybrid welding by using the filler metal.

In these present inventions, the first composing member 12 has the transverse section shape constituted by, for example, a groove bottom portion 12e which exists extended in a first direction (direction orthogonal to a paper surface of FIG. 1B to FIG. 1D), two edge line portions 12d, 12d which are connected to the groove bottom portion 12e in both edge portions in a width direction orthogonal to the first direction, two vertical wall portions 12c, 12c which are each connected to the two edge line portions 12d, 12d, two bent portions 12b, 12b which are each connected to the two vertical wall portions 12c, 12c and bent toward an inner side of the closed transverse section shape, and two inward flanges 12a, 12a which are each connected to the two bent portions 12b, 12b.

In these present inventions, the second composing member 13 may be a metal material of a flat plate shape as a closing plate as shown in FIG. 1B. Further, the second composing member 14, 15 may be a molded body of a metal sheet, the molded boy having a shape which has a transverse section shape similar to that of the first composing member 12 as shown in FIG. 1C and FIG. 1D, for example. In this case, it suffices that the inward flanges 12a, 12a formed in the first composing member 12 and the inward flanges 16a, 16a formed in the second composing member 14, 15 are overlapped with each other.

In these present inventions, when a curvature radius of the bent portion 12b is too large, formation of the load transmission portion 20 by an easy means such as arc welding or laser-arc hybrid welding becomes not easy, and thus the curvature radius of the bent portion 12b is desirable to be 8 mm or less. In contrast, when the curvature radius is tried to be made too small, molding of the first composing member 12 becomes difficult, and thus the curvature radius is desirable to be 2 mm or more.

Further, the automobile structural member 2 to 4 according to the present invention is used as a skeletal frame member of an automobile vehicle body (body shell) having a monocoque structure. Concretely, the automobile structural member 2 to 4 is used for a side sill, a bumper reinforcement, and a center pillar.

Advantageous Effects of Invention

According to an automobile structural member of the present invention, it is possible to improve a bending crushing performance from a bending crushing performance of a conventional automobile structural member.

DESCRIPTION OF EMBODIMENTS

Hereinafter, embodiments for implementing the present invention will be described. Note that in the description hereinafter, there is exemplified a case where an automobile structural member according to the present invention is a side sill. However, the present invention is not limited to the side sill, but is applicable to an automobile structural member which has a closed transverse section shape constituted with the aforementioned first composing member and second composing member and to which a three-point bending load is supposed to be placed at a time of collision of an automobile, such as a bumper reinforcement and a center pillar, for example.

Figure 1A:
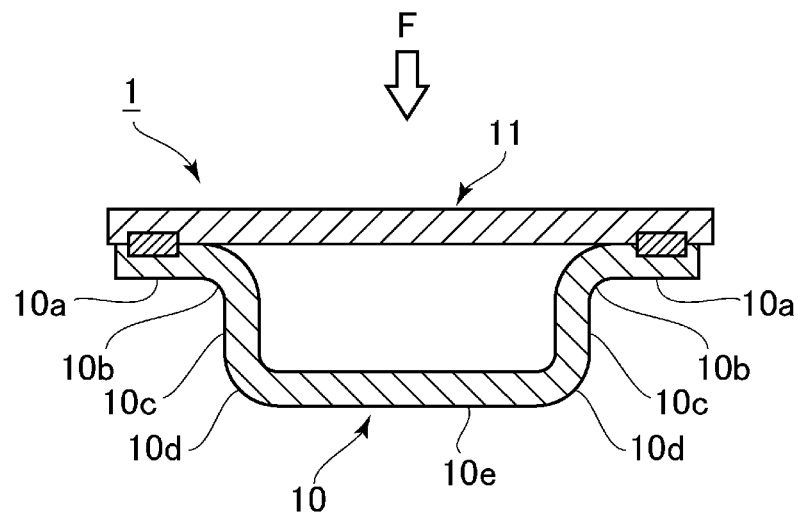
FIG. 1A is a diagram showing an example of a transverse section shape of a conventional automobile structural member.
Figure 1B:
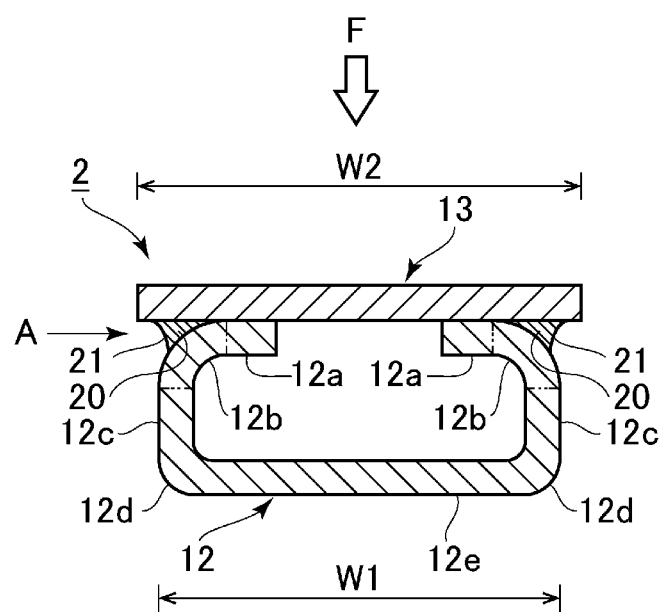
FIG. 1B is a diagram showing an example of a transverse section shape of an automobile structural member of a first embodiment.
Figure 1C:
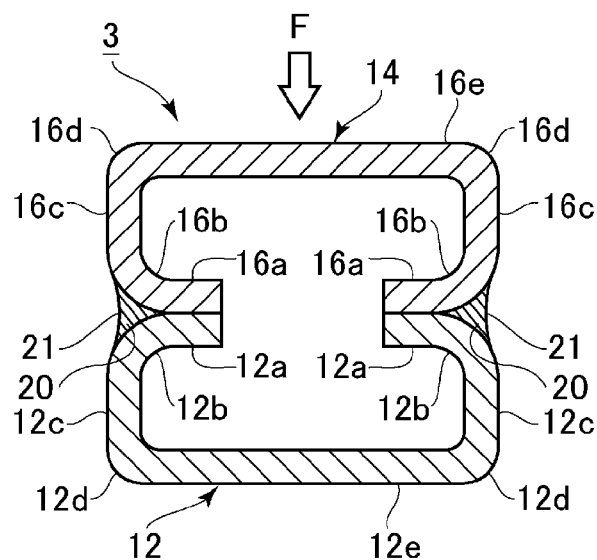
FIG. 1C is a diagram showing an example of a transverse section shape of an automobile structural member of a second embodiment.
Figure 1D:
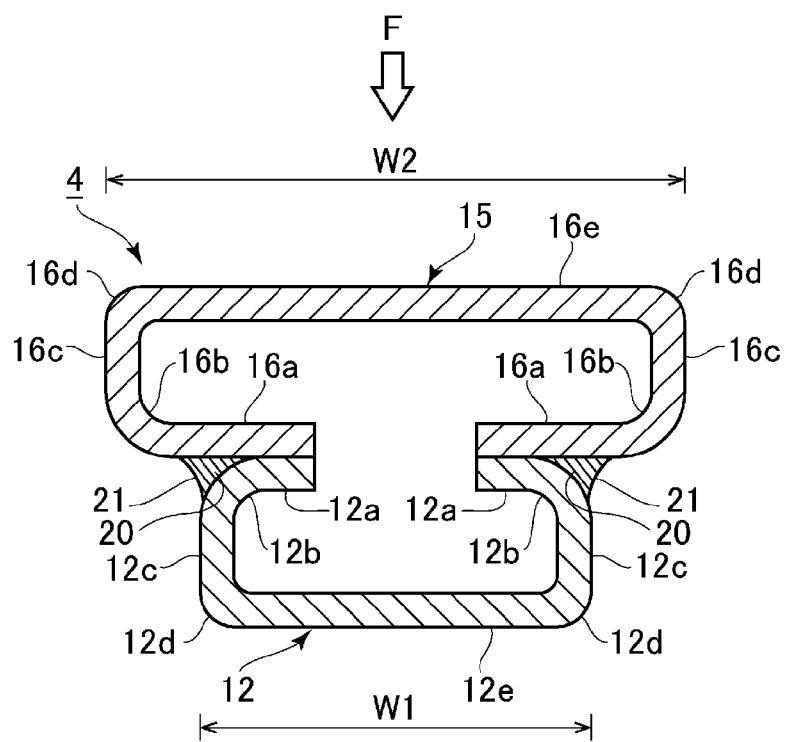
FIG. 1D is a diagram showing an example of a transverse section shape of an automobile structural member of a third embodiment.
Figure 2:
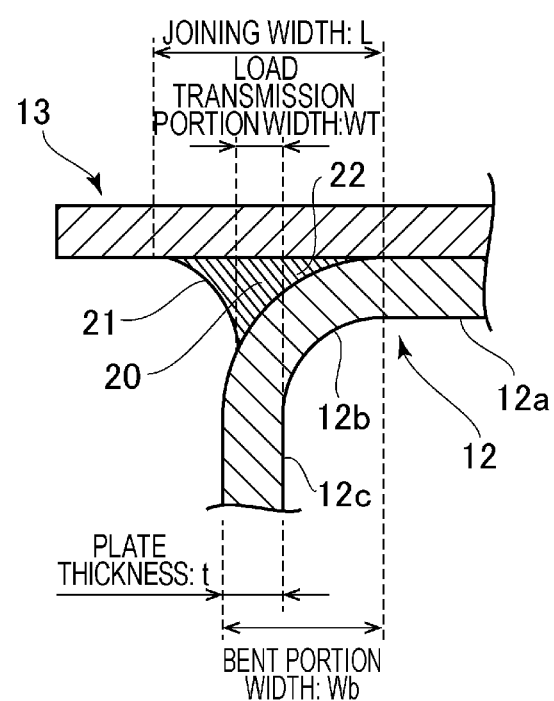
FIG. 2 is a diagram showing a periphery of a load transmission portion in the automobile structural member of the present embodiment.

FIG. 1A is a diagram showing an example of a transverse section shape of a conventional automobile structural member 1. FIG. 1B to FIG. 1D are diagrams each showing an example of a transverse section shape of an automobile structural member 2 to 4 according to the present embodiment. Further, FIG. 2 is a diagram showing a periphery of a load transmission portion 20 in the automobile structural member 2 according to the present invention. FIG. 2 is the diagram obtained by enlarging a part A in FIG. 1B, and similar explanation is also applicable to FIG. 1C and FIG. 1D.

First, the conventional automobile structural member 1 will be simply described with reference to FIG. 1A.

The automobile structural member 1 has a first composing member 10 and a second composing member 11.

The first composing member 10 has two outward flanges 10a, 10a, two bent portions 10b, 10b each connected to the two outward flanges 10a, 10b, two vertical wall portions 10c, 10c each connected to the two bent portions 10b, 10b, two edge line portions 10d, 10d each connected to the two vertical wall portions 10c, 10c, and one groove bottom portion 10e to which the two edge line portions 10d, 10d are each connected.

The first composing member 10 has a transverse section shape of a hat shape constituted with the two outward flanges 10a, 10a, the two bent portions 10b, 10b, the two vertical wall portions 10c, 10c, the two edge line portions 10d, 10d, and the one groove bottom portion 10e. As described above, the first composing member 10 is a molded body (hat member) with a hat-shaped cross section which has the outward flange 10a.

On the other hand, the second composing member 11 is a closing plate and is formed into a flat plate shape.

The first composing member 10 and the second composing member 11 are assembled by being spot-welded by using the outward flanges 10a, 10a as welding margins.

Differently from the automobile structural member 1 shown in FIG. 1A, there is also a case where the second composing member 11 is a molded body (hat member) with a hat-shaped cross section which has an outward flange similarly to the first composing member 10. In this case, the first composing member 10 and the second composing member 11 are assembled as a result that the respective outward flanges are spot-welded by using each outward flange as the welding margin in a state where the outward flanges are overlapped on each other.

The automobile structural member 1 is fixedly supported at two places on both end sides of a longitudinal direction (direction orthogonal to a paper surface of FIG. 1A) and constitutes a side sill composing an automobile vehicle body (body shell).

The automobile structural member 1 is a member supposed to receive an impact load F between two fixedly supporting position on both end sides of the longitudinal direction (direction orthogonal to the paper surface of FIG. 1A), the impact load F being placed from the second composing member 11 toward the first composing member 10.

When the impact load is placed from the second composing member 11 toward the first composing member 10, the impact load inputted from the second composing member 11 is transmitted to the outward flanges 10a, 10a, the bent portions 10b, 10b, the vertical wall portions 10c, 10c of the first composing member 10 in sequence. In other words, since the inputted impact load is transmitted to the vertical wall portions 10c, 10c inevitably via the bent portions 10b, 10b, the vertical wall portions 10c, 10c are apt to be buckle-deformed early, and it is difficult to transmit the impact load to the vertical wall portions 10c, 10c efficiently.

Next, the automobile structural members 2 to 4 according to the present embodiment will be described with reference to FIG. 1B to FIG. 1D.

Since the automobile structural member 2 to 4 according to the present embodiment has at least a first composing member 12, a second composing member 13, 14, 15, and a load transmission portion 20, the above are described in sequence.

Here, the first composing member 12 and the second composing member 13, 14, 15 are each molded bodies constituted with a cold-rolled steel sheet, a hot-rolled steel sheet, and further a plated steel sheet, for example, and a kind, strength, a thickness, or the like of the steel sheet is not limited. For example, when the automobile structural member 2 to 4 is a side sill, in general, a 440 to 980 MPa class high-tension steel sheet with a thickness of about 1.2 mm to 2.0 mm is used, but it is also possible to use a 1180 to 1470 MPa class high-tension steel sheet and to thin a plate thickness to as far as about 1.0 mm. As will be described later, when a joining portion 21 (load transmission portion) is formed by arc welding or laser-arc hybrid welding, it is desirable to use a steel sheet of 1.0 mm or more in order to reduce deformation due to thermal strain.

[First Composing Member]

The first composing member 12 is made by a molded body of a plate material, and has a groove bottom portion 12e, two edge line portions 12d, 12d, two vertical wall portions 12c, 12c, two bent portions 12b, 12b, and two inward flanges 12a, 12a.

The groove bottom portion 12e is extended in a first direction (direction orthogonal to a paper surface of FIG. 1B to FIG. 1D). The two edge line portions 12d, 12d are connected to the groove bottom portion 12e in both edge portions in a width direction orthogonal to the first direction. The two vertical wall portions 12c, 12c are each connected to the two edge line portions 12d, 12d. The two bent portions 12b, 12b are each connected to the two vertical wall portions 12c, 12c and bent toward an inner side of a closed transverse section shape. Further, the two inward flanges 12a, 12a are each connected to the two bent portions 12b, 12b.

Note that in FIG. 1B, a boundary between the vertical wall portions 12c, 12c and the bent portions 12b, 12b and a boundary between the bent portions 12b, 12b and the inward flanges 12a, 12a are indicated by two-dot chain lines.

The first composing member 12 has the transverse section shape constituted with the groove bottom portion 12e, the two edge line portions 12d, 12d, the two vertical wall portions 12c, 12c, the two bent portions 12b, 12b, and the two inward flanges 12a, 12a.

As described above, the first composing member 12 has the vertical wall portions 12c, 12c, the bent portions 12b, 12b, and the inward flanges 12a, 12a connected to the bent portions 12b, 12b.

Here, if a curvature radius of the bent portions 12b, 12b exceeds 8 mm, amounts of spaces formed between the bent portions 12b, 12b and the second composing member 13 become large. Thus, when the load transmission portion 20 is formed by welding in which a filler metal is used such as a later-described arc welding and laser-arc hybrid welding, not only a joining cost is increased but also an amount of the filler metal is required to be increased. Therefore, welding heating input becomes large, leading to easy occurrence of deformation or burn-through of the first composing member 12 and the second composing member 13 to 15 due to thermal strain. Further, when the load transmission portion 20 is formed by brazing or bonding, a joining cost is increased. Thus, the curvature radius of the bent portions 12b, 12b is desirable to be 8 mm or less, and is more desirable to be 6 mm or less.

From such a viewpoint it is not necessary to set a lower limit of the curvature radius of the bent portions 12b, 12b, but it is difficult to mold bent portions 12b, 12b with a curvature radius of less than 2 mm in an industrial mass production line. Therefore, the curvature radius of the bent portions 12b, 12b is desirable to be 2 mm or more.

Note that the curvature radius of the bent portion means a curvature radius of a curved surface on an outer side of curved surfaces of the bent portion 12b, the curved surface on the outer side having the larger curved radius.

The first composing member 12 may be molded by any molding method, and the molding method is not limited to a specific one. However, if a manufacturing cost is increased by press molding in order to form an inward flange 12a, molding can be carried out by roll forming or by using a press brake.

[Second Composing Member]

The second composing member 13 to 15 is joined to the first composing member 12 via the inward flanges 12a, 12a. Thereby, the automobile structural member 2 to 4 has the closed transverse section shape constituted with the first composing member 12 and the second composing member 13 to 15.

As shown in FIG. 1B, the second composing member 13 according to a first embodiment is a plate material such as a closing plate, for example. The automobile structural member 2 of the first embodiment, when a width of the first structural member 12 is indicated as W1 and a width of the second composing member 13 is indicated as W2, is formed to satisfy W2>W1.

On the other hand, as shown in FIG. 1C and FIG. 1D, the second composing member 14, 15 according to second and third embodiment is a molded body having a transverse section shape similar to that of the first composing member 12, for example. Concretely, the second composing member 14, 15 has a groove bottom portion 16e extended to a first direction (direction orthogonal to a paper surface of FIG. 1C, FIG. 1D), two edge line portions 16d, 16d connected to the groove bottom portion 16e in both edge portions in a width direction orthogonal to the first direction, two vertical wall portions 16c, 16c each connected to the two edge line portions 16d, 16d, two bent portions 16b, 16b each connected to the two vertical wall portions 16c, 16c and bent toward an inner side of the closed transverse section shape, and two inward flanges 16a, 16a each connected to the two bent portions 16b, 16b.

Automobile structural member 3, 4 is configured as a result that the inward flanges 12a, 12a formed in the first composing member 12 and the inward flanges 16a, 16a formed in the second composing member 14, 15 are overlapped on each other.

A second composing member 14 of a second embodiment has a transverse section shape the same as that of a first composing member 12.

On the other hand, a second composing member 15 of a third embodiment has a transverse section shape in which a groove bottom portion 16e and inward flanges 16a, 16a are longer in a width direction than that of a first composing member 12. Therefore, when a width of the first composing member 12 is indicated as W1 and a width of the second composing member 15 is indicated as W2, the second composing member 15 of the third embodiment is formed to satisfy W2>W1.

The second composing member 14, 15 having the inward flanges 16a, 16a may be molded by any molding method, and the molding method is not limited to a specific one. However, if a manufacturing cost is increased by press molding in order to form an inward flange 16a, molding can be carried out by roll forming or by using a press brake.

Note that the automobile structural member 2 to 4 may further have a composing member other than the first composing member 12 and the second composing member 13, 14, 15. For example, it is possible to have a third composing member between the first composing member 12 and the second composing member, the third composing member functioning as a reinforcement by being three-layer lap-welded with the first composing member 12 and the second composing member.

[Load Transmission Portion]

Here, as shown in FIG. 2, the load transmission portion 20 which the automobile structural member 2 of the first embodiment has will be described, and the same applies to the automobile structural members 3, 4 of the second and third embodiments.

As shown in FIG. 2, the load transmission portion 20 is formed in a part or all of a region being a region between the bent portion 12b of the first composing member 12 and the second composing member 13 and being a region of an extension of the vertical wall portion 12c toward the second composing member 13.

The load transmission portion 20 constitutes a part of a joining portion 21 which joins the first composing member 12 and the second composing member 13. Therefore, the load transmission portion 20 joins the bent portion 12b and the second composing member 13 in the above-described region.

The joining portion 21 is formed by filling a part or all of a space 22 which exists between the bent portion 12b and the second composing member 13. The space 22 is formed in an outer side of a closed section constituted with the first composing member 12 and the second composing member 13. Therefore, the joining portion 21 can be formed easily by means such as arc welding, laser-arc hybrid welding, and further, brazing, and bonding, without increasing an assembly process.

Further, in arc welding, laser-arc hybrid welding, and further, brazing, strength of the joining portion 21 including the load transmission portion 20 can be adjusted by kinds of a welding wire as the filler metal. For example, by using a high-strength wire, it is also possible to make strength of the joining portion 21 higher than steel sheet strength of the first composing member 12 and steel sheet strength of the second composing member 13.

In particular, when the joining portion 21 is formed by arc welding or laser-arc hybrid welding, a neighborhood of the bent portion 12b of the first composing member 12 is quench-strengthened by heat input at a time of welding. Therefore, the joining portion 21 including the load transmission portion 20 is desirable to be formed by arc welding or laser-arc hybrid welding by using a filler metal. In this case, the joining portion 21 is mainly deposited metal formed as a result that the filler metal is moved to the space 22 between the bent portion 12b and the second composing member 13.

Further, as shown in FIG. 2, when a joining width being a range in which the joining portion 21 is formed in the second composing member 13 is indicated as L (mm) and a width (hereinafter, referred to as a load transmission portion width) of the load transmission portion 20 to a plate thickness direction of the vertical wall portion 12c is indicated as WT (mm), the joining width L is desirable to be longer than the load transmission portion width WT.

In order to make the joining width L longer than the load transmission portion width WT, it is desirable that the width W2 of the second composing member 13, 15 is formed longer than the width W1 of the first composing member 12, as in the automobile structural member 2 shown in FIG. 1B and the automobile structural member 4 shown in FIG. 1D. In other words, it is desirable that both ends in the width direction of the second composing member 13, 15 are positioned in outer sides than both ends in the width direction of the first composing member 12.

As a result that the joining width L of the joining portion 21 is made long as described above, the joining portion 21 is formed to be broadened toward the second composing member 13, so that an impact load transmitted from the second composing member 13, 15 to the first composing member 12 can be transmitted effectively to the vertical wall portion 12c.

Further, as shown in FIG. 2, when a width (hereinafter, bent portion width) of the bent portion 12b is indicated as Wb, it is possible to form the joining portion 21 to be broadened toward the second composing member 13 by making the joining width L longer than the bent portion width Wb.

According to the automobile structural member 2 to 4, as described above, the joining portion 21 can be formed easily by a proper operation means such as arc welding, laser-arc hybrid welding, brazing, and bonding, without increasing the assembly process. Therefore, formation of the joining portion 21 is easy and the load transmission portion 20 can be formed efficiently.

Further, according to the automobile structural member 2 to 4, it is possible to transmit the impact load transmitted from the second composing member 13, 14, 15 to the first composing member 12 to the vertical wall portion 12c effectively by the load transmission portion 20 not by way of the bent portion 12b. Therefore, the automobile structural member 2 to 4 can improve a bending crushing performance by a large margin from a bending-crushing performance of the conventional automobile structural member.

Further, since the joining portion 21 which joins the first composing member 12 and the second composing member 13, 14, 15 is formed, a joining portion is not required to be formed at overlapped portions of the inward flanges 12a, 12a and the second composing member 13. Therefore, in a width of the inward flanges 12a, 12a, it becomes unnecessary to secure a spot welding margin of about 20 to 30 mm as in a width of the outward flange of the first composing member constituting the conventional automobile structural member. In other words, it suffices that the automobile structural member 2 to 4 has a width (for example, about 5 to 10 mm) enough to secure butt welding accuracy of the first composing member 12 and the second composing member 13, 14, 15, and thus substantial weight reduction can be contrived compared with the conventional automobile structural member.

Further, the joining portion 21 can be formed easily by the proper means such as arc welding, laser-arc hybrid welding, and further, brazing, and bonding, without increasing the assembly process. Therefore, the automobile structural member 2 to 4 can suppress man-hour and cost necessary for manufacturing to a degree similar to that in the conventional automobile composing member.

Further, since the automobile structural member 2 to 4 does not have an outward flange which the conventional automobile structural member has, it is possible to contrive cross section reduction in relation to the conventional automobile structural member.

Further, hardness of a range which at least the load transmission portion 20 is in contact with is desirable to be higher than hardness of a base material of the first composing member. By forming the joining portion 21 which includes the load transmission portion 20 by welding, a neighborhood of the bent portion 12b of the first composing member 12 is quench-strengthened by heat input at a time of welding. As described above, as a result that the bent portion 12b of the first composing member 12 and its neighborhood are strengthened by heat input at the time of welding, deformation of transverse section shape of the automobile structural member 2 to 4 is suppressed to improve a maximum bending load. In particular, the range in which the hardness of the first composing member 12 becomes high due to heat input at the time of welding is desirable to be as broad as from the bent portion 12b through the vertical wall portion 12c. In order to harden broadly as far as to the vertical wall portion 2c, a curvature radius of the bent portion 12b is made small. Further, in view of a welding condition, it is devised to heighten an arc welding voltage, to defocus a laser focal point, or the like, in a range where weldability is not impaired.

Further, the longer the load transmission portion width WT of the load transmission portion 20 is, the larger the maximum bending load becomes. When the joining portion 21 including the load transmission portion 20 is formed by welding, the longer load transmission portion width WT can be realized by increasing an amount of a filler metal. On the other hand, in order to increase the amount of the filler metal, a welding current is required to be heightened, and thus, there is a possibility that the first composing member 12 or the second composing member is burned through. Thus, when the joining portion 21 including the load transmission portion 20 is to be formed, it is desirable that the same part is welded by a plurality of operations. By welding the same part by the plurality of operations, a welding input heat amount to the first composing member 12 and the second composing member 13 each time can be reduced, so that the first composing member 12 and the second composing member 13 can be prevented from burn-through.

Further, when the joining portion 21 including the load transmission portion 20 is formed by welding, thermal strain occurs in the automobile structural member. When the thermal strain is large, there is a possibility that a dimension error occurs in relation to a desired dimension of the automobile structural member. Thus, when the thermal strain becomes large, it is desirable to weld intermittently through an entire length of the automobile structural member. As a result of welding intermittently through the entire length of the automobile structural member 2 to 4, influence of the thermal strain can be decreased, enabling suppression of occurrence of the dimension error.

Example

[Comparison of Maximum Bending Loads]

Next, performances between an automobile structural member of a comparative example and an automobile structural member of a present invention example are compared.

Figure 3A:
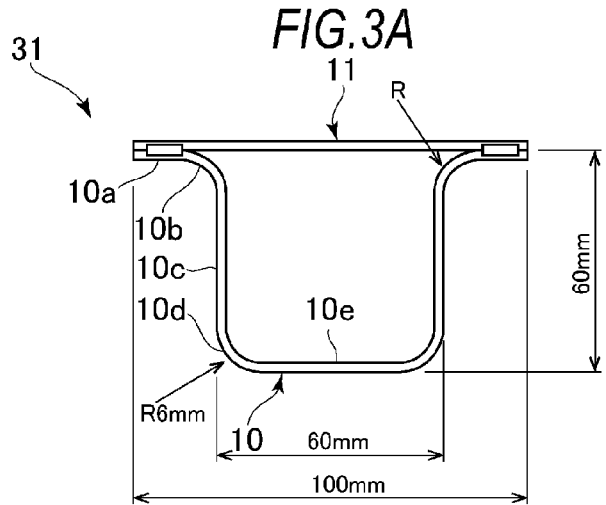
FIG. 3A is a diagram showing a transverse section shape of an automobile structural member of a first comparative example.

FIG. 3A is a diagram showing a transverse section shape of an automobile structural member 31 of a first comparative example.

The automobile structural member 31 of the first comparative example is fabricated by spot welding an outward flange 10a of a hat member 10 being a first composing member and a closing plate 11 being a second composing member. Here, a curvature radius R of a bent portion 10b shown in FIG. 3A is 6 mm.

Spot welding is carried out with a spot pitch being 30 mm for an entire length of 600 mm in a longitudinal direction. With regard to a welding condition, a pressurizing force is 3920 N, a power-on time is changed in correspondence with a plate thickness, being 0.27 seconds for a plate thickness of 1.2 mm and 0.4 seconds for a plate thickness of 2.0 mm described later, and a welding current is adjusted to be able to obtain a nugget diameter of $5\sqrt{t}$ for each plate thickness t (note that "t" is included in $\sqrt{}$).

Figure 3B:
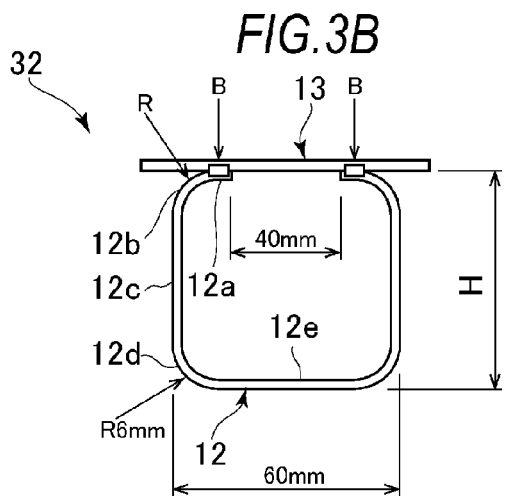
FIG. 3B is a diagram showing a transverse section shape of an automobile structural member of a second comparative example.

FIG. 3B is a diagram showing a transverse section shape of an automobile structural member 32 of a second comparative example.

The automobile structural member 32 of the second comparative example is fabricated by laser welding a bent portion 12b formed between an inward flange 12a and a vertical wall portion 12c of a first composing member 12, and a closing plate 13 being a second composing member from an arrow B direction. "R" shown in FIG. 3B indicates a curvature radius of the bent portions 12b, 12b. Further, a height H of the first composing member 12 is 60 mm.

Laser welding simply melts and joins the bent portions 12b, 12b and the closing plate 13. Therefore, in the automobile structural member 32 of the second comparative example, a load transmission portion is not formed between the bent portions 12b, 12b and the closing plate 13.

In laser welding, continuous welding is carried out through an entire length of 600 mm in a longitudinal direction, a welding speed is constant at 2 m/min, an output is changed in correspondence with a plate thickness, 2.5 kW for a plate thickness of 1.2 mm and 4.0 kW for a plate thickness of 2.0 mm described later. Further, just focus is applied to a laser focal point.

Figure 3C:
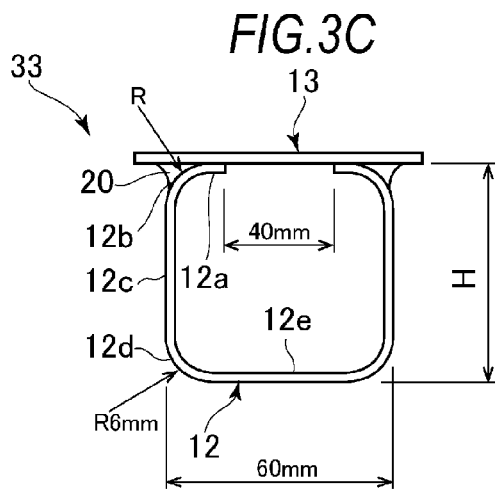
FIG. 3C is a diagram showing a transverse section shape of the automobile structural member of a present invention example.

FIG. 3C is a diagram showing a transverse section shape of an automobile structural member 33 of the present invention example.

The automobile structural member 33 of the present invention example is fabricated by arc welding a bent portion 12b formed between an inward flange 12a and a vertical wall portion 12c of a first composing member 12, and a closing plate 13 being a second composing member. "R" shown in FIG. 3C indicates a curvature radius of the bent portions 12b, 12b. Further, a height H of the first composing member 12 is 60 mm.

In arc welding, the bent portions 12b, 12b and the closing plate 13 are joined by using a welding wire as a filler metal. Therefore, in the automobile structural member 33 of the present invention example, load transmission portions 20 are formed in spaces between the bent portions 12a, 12a and the closing plate 13.

In arc welding, continuous welding is carried out through an entire length of 600 mm in a longitudinal direction, a welding speed is constant at 60 mm/min, a welding current and a welding voltage are changed between 110 A to 170 A, and 15 V to 20 V, in correspondence with a plate thickness. Further, as shield gas, Ar+20% $CO_2$ is used, and as the welding wire, a welding wire of 60 kgf class of $\phi\frac{1}{2}$ mm is used.

Here, automobile structural members 31, 32, 33 having transverse section shapes shown in FIG. 3A to FIG. 3C respectively are fabricated by using 440 MPa class non-plating steel sheets with a plate thickness of 1.2 mm and a plate thickness of 2.0 mm. On this occasion, the automobile structural members 32, 33 of the second comparative example 2 and the present invention example are fabricated by changing the curvature radius R of the bent portions 12b, 12b from 2 mm to 10 mm at an interval of 2 mm per plate thickness of the steel sheet.

A bending performance of each of the fabricated automobile structural members 31, 32, 33 is evaluated by static three-point bending test. As a test condition, a supporting point interval is 500 mm, a supporting point curvature radius is 30 mm, an impactor curvature radius is 150 mm, and a crushing speed is 50 mm/min.

Table 1 shows test results of maximum bending loads.

Figure 4:
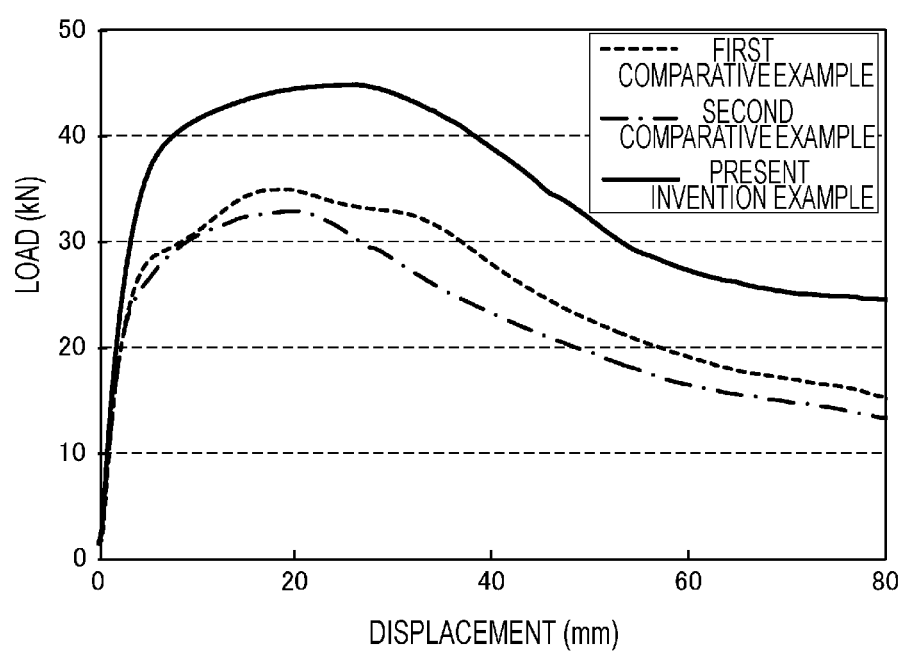
FIG. 4 is a graph showing a load-displacement curve at a time that a plate thickness is 2.0 mm and that a curvature radius of a bent portion is 6 mm.

FIG. 4 shows a graph of a load-displacement curve at a time that an impactor is displaced in a representative case where a plate thickness is 2.0 mm and a curvature radius R of a bent portion is 6 mm.

Figure 5A:
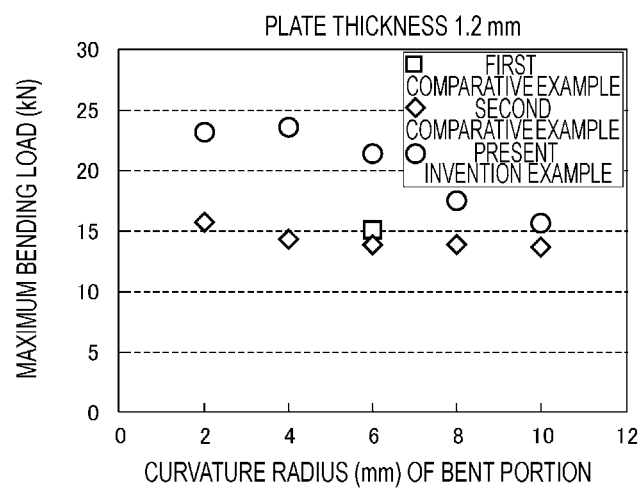
FIG. 5A is a graph showing a maximum bending load-curvature radius of bent portion at a time that a plate thickness is 1.2 mm.
Figure 5B:
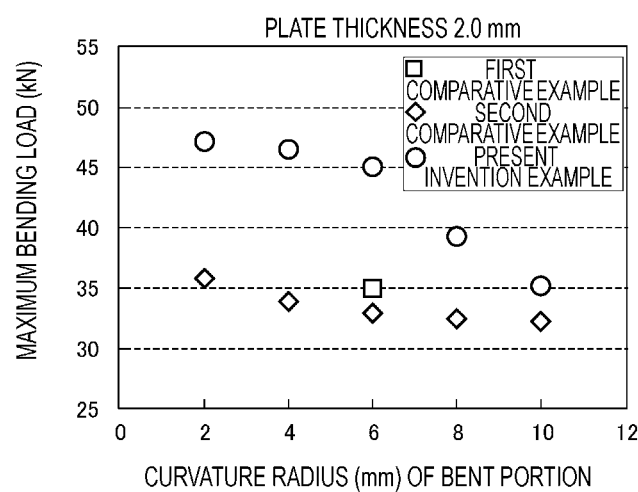
FIG. 5B is a graph showing a maximum bending load-curvature radius of bent portion at a time that a plate thickness is 2.0 mm.

FIG. 5A shows a graph of maximum bending load-curvature radius of bent portion at a time of a plate thickness of 1.2 mm, and FIG. 5B shows a graph of a maximum bending load-curvature radius of bent portion at a time of a plate thickness of 2.0 mm.

TABLE 1

| Plate Thickness t (mm) | Welding Method | Curvature Radius of Bent Portion R (mm) | Load Transmission Portion Width WT | Joining Width L | Maximum Bending Load (kN) | Classification |
|---|---|---|---|---|---|---|
| 1.2 | Spot Welding | 6 | — | — | 15.0 | First Comparative Example |
| | Laser Welding | 2 | — | — | 15.6 | Second Comparative Example |
| | | 4 | — | — | 14.2 | Second Comparative Example |
| | | 6 | — | — | 13.8 | Second Comparative Example |

TABLE 1-continued

| Plate Thickness t (mm) | Welding Method | Curvature Radius of Bent Portion R (mm) | Load Transmission Portion Width WT | Joining Width L | Maximum Bending Load (kN) | Classification |
|---|---|---|---|---|---|---|
| | | 8 | — | — | 13.8 | Second Comparative Example |
| | | 10 | — | — | 13.6 | Second Comparative Example |
| | Arc Welding | 2 | 1.0t | 1.45t | 23.6 | Present Invention Example |
| | | 4 | 0.75t | 1.35t | 23.5 | Present Invention Example |
| | | 6 | 0.55t | 1.0t | 21.2 | Present Invention Example |
| | | 8 | 0.2t | 0.4t | 17.3 | Present Invention Example |
| | | 10 | 0.0t | 0.1t | 15.5 | — |
| 2.0 | Spot Welding | 6 | — | — | 34.8 | First Comparative Example |
| | Laser Welding | 2 | — | — | 35.8 | Second Comparative Example |
| | | 4 | — | — | 34.0 | Second Comparative Example |
| | | 6 | — | — | 32.9 | Second Comparative Example |
| | | 8 | — | — | 32.6 | Second Comparative Example |
| | | 10 | — | — | 32.3 | Second Comparative Example |
| | Arc Welding | 2 | 1.0t | 1.8t | 47.1 | Present Invention Example |
| | | 4 | 0.85t | 1.4t | 46.3 | Present Invention Example |
| | | 6 | 0.6t | 1.1t | 44.9 | Present Invention Example |
| | | 8 | 0.3t | 0.5t | 39.3 | Present Invention Example |
| | | 10 | 0.0t | 0.1t | 35.2 | — |

As shown in Table 1, in the first comparative example and the second comparative example, since in neither case a load transmission portion is formed, columns of the load transmission portion width WT and the joining width L are vacant. On the other hand, in the present invention example, since the load transmission portion 20 is formed, values obtained by measuring the load transmission portion width WT and the joining width L are listed. On this occasion, the spaces between the bent portions 12b, 12b and the closing plate 13 are increased as the curvature radius R of the bent portion 12b becomes larger, and the load transmission portion width WT and the joining width L become small.

As shown in FIG. 4, when compared with a case of the curvature radius R of 6 mm, the load is larger in the present invention example than in the first comparative example and the second comparative example at any displacement.

Further, as shown in FIG. 5A and FIG. 5B, when compared with a case of the curvature radius R of 6 mm, the maximum bending load is larger in order of the present invention example, the first comparative example, and the second comparative example. As described above, it can be verified that the bending crushing performance can be substantially improved in the present invention example. Note that the reason why the maximum bending load is larger in the first comparative example than in the second comparative example is a difference between lengths of respective flanges and lengths of the second composing members.

Further, when the second comparative example and the present invention example are compared, the maximum bending load of the present invention example is larger than that of the second comparative example in any curvature radius R of bent portion 12b. Therefore, it can be verified that by forming the load transmission portion 20 as in the present invention example the maximum bending load is improved more than in the second comparative example in which a load transmission portion 20 is not formed.

Further, when the second comparative example and the present invention example are compared, in a case where the curvature radius R of the bent portion 12b is 2 mm or more to 8 mm or less and further in a case where the curvature radius R is 2 mm or more to 6 mm or less, the maximum bending load is substantially larger in the present invention example than in the second comparative example. Since respective shapes of the first composing members 12 and the second composing members 13 are the same in the present invention example and the second comparative example, a relative difference between the maximum bending loads is considered to be attributed to a difference between load transmission portion widths WT.

Therefore, from the test results of the plate thickness of 1.2 mm of Table 1, when the load transmission portion width WT satisfies 0.2t≤WT≤1.0t, preferably 0.55t≤WT≤1.0t, it is possible to make the maximum bending load in particular larger than in the second comparative example.

Further, from the test results of the plate thickness of 2.0 mm of Table 1, when the load transmission portion width WT satisfies 0.3t≤WT≤1.0t, preferably 0.6t≤WT≤1.0t, it is possible to make the maximum bending load in particular larger than in the second comparative example.

In other words, it is desirable to form the load transmission portion 20 so that the load transmission portion width WT satisfies a relation of 0.3t≤WT≤1.0t, preferably 0.6t≤WT≤1.0t, a common range between the plate thickness of 1.2 mm and the plate thickness of 2.0 mm being extracted.

[Hardness of Bent Portion]

Next, hardness of the automobile structural member 33 of the present invention example after welding is verified.

Figure 6:
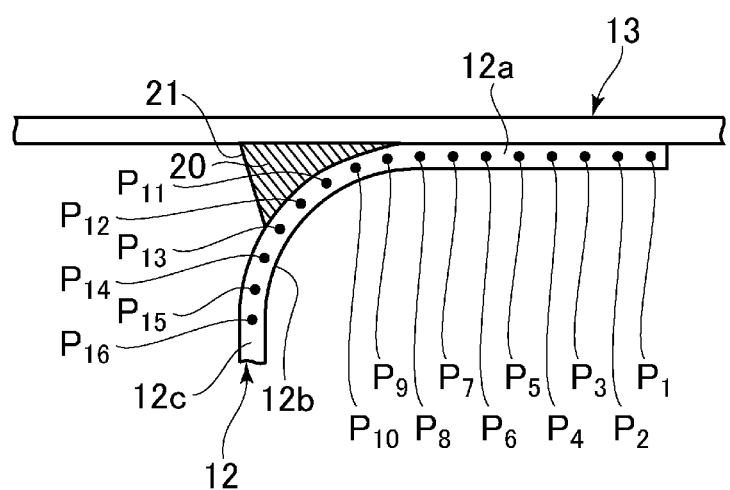
FIG. 6 is a diagram showing a transverse shape of an inward flange periphery of an automobile structural member.

FIG. 6 is a diagram showing a transverse section shape around the inward flange 12a of the automobile structural member 33 of the present invention example. The automobile structural member 33 of the present invention example is fabricated by using a 440 MPa class non-plated steel sheet with a thickness of 1.2 mm shown in Table 1, with a curvature radius R of the bent portion 12b being 6 mm. A condition of the arc welding is the same as the welding condition in the arc welding in Table 1.

Here, Vickers hardness is measured by pushing an indenter to the first composing member 12 at positions $P_1$ to $P_{16}$ shown in FIG. 6, in a direction orthogonal to a paper surface of FIG. 6. Note that Vickers hardness of a base material of the first composing member 12 before welding is about 140 Hv.

As a result, $P_1$ to $P_5$ shown in FIG. 6 are about 140 Hv, becoming gradually harder toward the bent portion 12b, $P_8$ to $P_{14}$ are about 250 Hv, becoming gradually lower toward the vertical wall portion 12c, $P_{15}$ is about 220 Hv, and $P_{16}$ is about 170 Hv.

Therefore, it can be verified that in the bent portion 12b of the automobile structural member 33 of the invention example, hardness of a range which at least the load transmission portion 20 is in contact with is higher than hardness of the base material of the first composing member 35.

[Chemical Component]

Further, by setting a carbon equivalent Ceq to be 0.15 or more, it is possible to harden the bent portion 12b and a neighborhood of the bent portion 12b of the first composing member 12 by heat input at the time of welding.

Here, the carbon equivalent Ceq is represented by the following formula.

$$Ceq=C+Si/24+Mn/6+Ni/40+Cr/5+Mo/4+V/4$$

In contrast, when the carbon equivalent Ceq is set to be too high, there is an apprehension of brittle fracture or hydrogen embrittlement, and thus the carbon equivalent Ceq is desirable to be 0.6 or less.

[Height and Plate Thickness of First Composing Member]

Next, influence which a height H and a plate thickness t of the first composing member 12 give to the maximum bending load is verified. Here, by using 440 MPa class non-plated steel sheets with a plate thickness of 1.2 mm and a plate thickness of 2.0 mm, the automobile structural member 32 of the second comparative example shown in FIG. 3B and the automobile structural member 33 of the present invention example shown in FIG. 3C are fabricate respectively. On this occasion, with the steel sheet with the plate thickness of 1.2 mm, ones with the heights H of the first composing members 12 of 30 mm and 60 mm are fabricated, and with the steel sheet with the plate thickness of 2.0 mm, ones with the heights H of the first composing members 12 of 30 mm, 60 mm, and 90 mm are fabricated. Note that the curvature radiuses R of the bent portions 12b are all 6.0 mm.

A bending performance of each of the fabricated automobile structural members 32, 33 is evaluated by a static three-point bending test. A test condition is similar to the test condition of Table 1.

Table 2 shows test results of maximum bending tests.

Figure 7A:
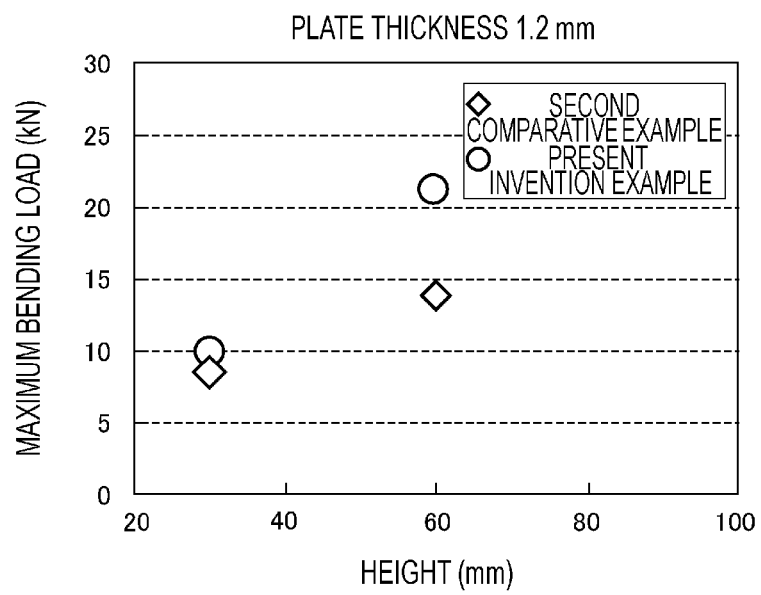
FIG. 7A is graph showing a maximum bending load-height of first composing member at a time that a plate thickness is 1.2 mm.
Figure 7B:
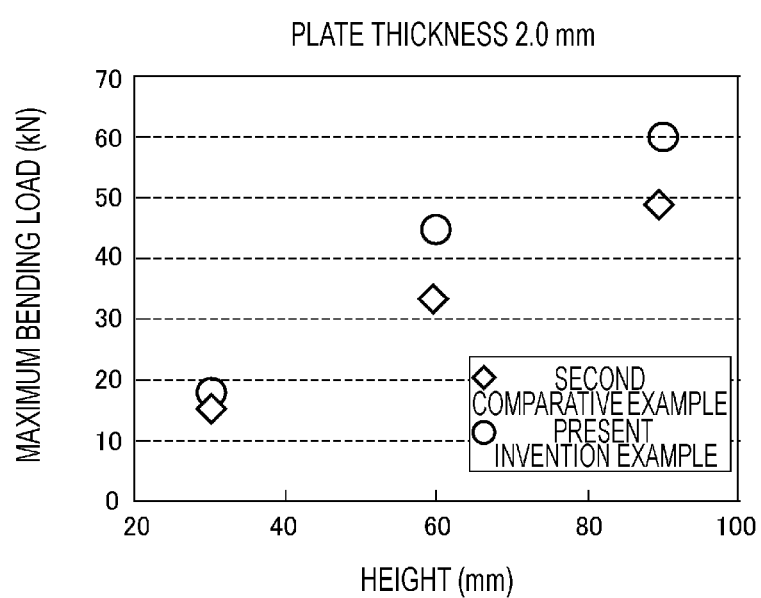
FIG. 7B is a graph showing a maximum bending load-height of first composing member at a time that a plate thickness is 2.0 mm.

FIG. 7A shows a graph of a maximum bending load-height in a case of the plate thickness of 1.2 mm, and FIG. 7B shows a graph of a maxim bending load-height in a case of the plate thickness of 2.0 mm.

TABLE 2

| Plate Thickness t (mm) | Welding Method | Height H (mm) | Load Transmission Portion Width WT | Joining Width L | Maximum Bending Load (kN) | Classification |
|---|---|---|---|---|---|---|
| 1.2 | Laser Welding | 30 | — | — | 8.5 | Second Comparative Example |
| | | 60 | — | — | 13.8 | Second Comparative Example |
| | Arc Welding | 30 | 0.55t | 1.0t | 10.2 | Present Invention Example |
| | | 60 | 0.55t | 1.0t | 21.2 | Present Invention Example |
| 2.0 | Laser Welding | 30 | — | — | 15.6 | Second Comparative Example |
| | | 60 | — | — | 32.9 | Second Comparative Example |
| | | 90 | — | — | 48.4 | Second Comparative Example |
| | Arc Welding | 30 | 0.6t | 1.1t | 17.5 | Present Invention Example |
| | | 60 | 0.6t | 1.1t | 44.9 | Present Invention Example |
| | | 90 | 0.6t | 1.1t | 58.4 | Present Invention Example |

As shown in Table 2, in the second comparative example, since a load transmission portion is not formed, columns of the load transmission portion width WT and the joining width L are vacant. On the other hand, in the present invention example, since the load transmission portion 20 is formed, values obtained by measuring the load transmission portion width WT and the joining width L are listed.

As shown in FIG. 7A and FIG. 7B, when compared in a case of the height H of 30 mm of the first composing member 12, the maximum bending load is larger in the present invention example than in the second comparative example.

Further, when compared in cases of heights H of 60 mm and 90 mm of the first composing member 12, the maximum bending load is substantially larger in the present invention example than in the second comparative example. When the height H of the first composing member 12 is high, such as 60 mm and 90 mm, the shape allows easier buckling deformation of the vertical wall portion 12c, compared with the case of the low height H such as 30 mm. Therefore, it is supposed that forming the load transmission portion 20 suppresses deformation of the vertical wall portion 12c more. Therefore, in the first composing member 12 whose vertical wall portion 12c is easy to be buckle-deformed as in the present invention example, by forming the load transmission portion 20, it is possible to exhibit a higher effect of deformation suppression of the transverse section shape.

Here, with the plate thickness of the first composing member 12 being indicated as "t" and the height being indicated as "H", H/t can be used as an index representing easiness to be buckle-deformed. From the test result of the plate thickness of 1.2 mm, it is desirable to form the load transmission portion 20 in the first composing member 12 in which H/t≥50 is satisfied. From the result result of the plate thickness of 2.0 mm, it is desirable to form the load transmission portion 20 in the first composing member 12 in which H/t≥30 is satisfied. In other words, a common range being extracted, it is desirable to form the load transmission portion 20 in the first composing member 12 in which a relation of H/t≥50 is satisfied.

In contrast, since too large H/t makes an automobile structural member large, H/t is desirable to be 90 or less.

[Number of Welding Operations]

Next, there is described a case where, when the joining portion 21 including the load transmission portion 20 is formed by welding, the same place is welded by a plurality of operations in order to prevent the first composing member 12 or the second composing member from being burned through.

For example, in the first operation, welding is carried out to an entire length of the automobile structural member so that the load transmission portion width WT satisfies 0<WT<0.3t (preferably 0<WT<0.6t) or so that the load transmission portion width WT satisfies WT<0.3t (preferably WT<0.6t) and the joining length L satisfies 0<L, and in the second operation (or second or later operation), welding is carried out through the entire length so that the load transmission portion width WT satisfies $0.3t \leq WT \leq 1.0t$ (preferably, $0.6t \leq WT \leq 1.0t$).

Further, for example, in the first operation, welding is carried out through the entire length of the automobile structural member so that the load transmission portion width WT satisfies $0.3t \leq WT \leq 1.0t$ (preferably, $0.6t \leq WT \leq 1.0t$), and in the second operation (or in second or later operation), welding is carried out to regulate a shape through the entire length so that the joining width L becomes larger than the load transmission portion width WT.

As a result of welding the same place by the plurality of operations as above, compared with a case where the load transmission portion 20 and the joining portion 21 are made to have a desired load transmission portion width WT by one operation, it is possible to reduce a welding heat input amount to the first composing member 12 and the second composing member per operation of welding, enabling prevention of burn-through of the first composing member 12 or the second composing member 13. In particular, when the curvature radius R of the bent portion 12 is larger than 8 mm, by welding by the plurality of operations, it is possible to make the load transmission portion width WT satisfy $0.6t \leq WT \leq 1.0t$ easily, and further, it is also possible to prevent burn-through.

[Length of Welding]

Next, there is verified a case where a length of welding is formed intermittently in order to reduce influence of thermal strain when the joining portion 21 including the load transmission portion 20 is formed by welding.

Figure 8A:
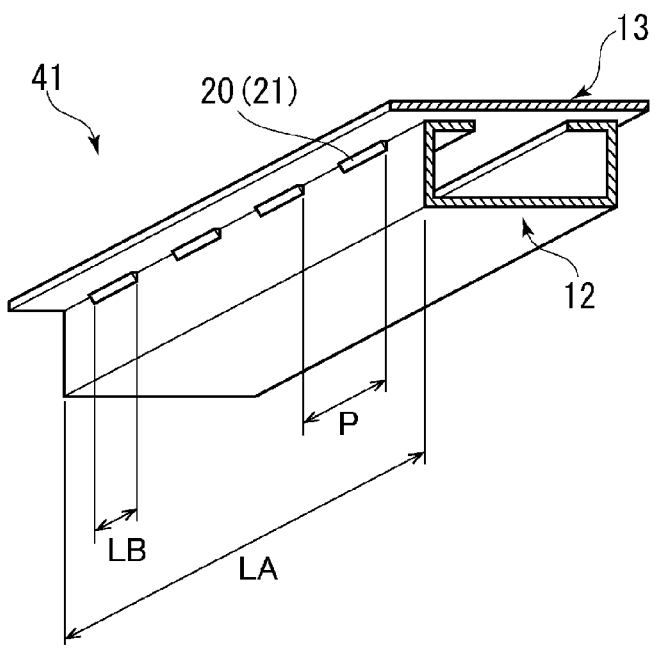
FIG. 8A is a perspective view showing an example of an automobile structural member welded intermittently.

FIG. 8A is a perspective view showing an example of an automobile structural member 41 welded intermittently. In the automobile structural member 41 shown in FIG. 8A, an entire length of a first composing member 12 is indicated as LA, a length of a joining portion 21, that is, a length (hereinafter, referred to as a welding length) of welding is indicated as LB, and a welding pitch is indicated as P. By intermittently welding as above, influence of thermal strain can be reduced and occurrence of a dimension error can be suppressed.

Here, automobile structural members in which welding lengths LB and welding pitches P are varied are fabricated, and maximum bending loads are compared. Here, by using a 440 MPa class non-plating steel sheet with a thickness of 2.0 mm and setting an entire length of a first composing member 12 to be 600 mm, setting a height H to be 60 mm, and setting a curvature radius R of a bent portion 12b to be 6 mm, an automobile structural member 33 shown in FIG. 3C is fabricated with the welding length LB and the welding pitch P being varied. Note that a welding condition is the same as the welding condition in arc welding of Table 1 except the welding length LB and the welding pitch P.

A bending performance of each of fabricated automobile structural members 33 is evaluated by a static three-point bending test. A test condition is similar to the test condition of Table 1.

Table 3 shows test results of the maximum ending tests.

TABLE 3

| Plate Thickness t (mm) | Welding Method | Welding Length LB(mm) | Welding Pitch P(mm) | Maximum Bending Load (kN) | Classification |
|---|---|---|---|---|---|
| 2.0 | Arc Welding | 600 | — | 44.9 | First Invention Example |
| | | 100 | 100 | 34 | Second Invention Example |
| | | 50 | 50 | 38 | Third Invention Example |

The first invention example to the third invention example shown in Table 3 each have the same load transmission portion width WT and the same joining width L. Further, in the first invention example, since the welding length LB is the same as an entire length of the first composing member 12, a column for the welding pitch P is vacant.

As shown in Table 3, in the second invention example and the third invention example in which arc welding is carried out intermittently, maximum bending loads are smaller compared with that in the first invention example in which arc welding is carried out for the entire length. On the other hand, in the third invention example, though the welding length LB and the welding pitch P are shorter compared with those in the second invention example, the maximum bending load is large. Therefore, when a joining portion 21 including a load transmission portion 20 is to be formed intermittently by welding, shortening a welding length LB and a welding pitch P can reduce influence of thermal strain, so that reduction of a maximum bending load can be suppressed.

Further, in at least two welding operations among the plurality of welding operations, the welding lengths can each be changed. Here, a case where two welding operations are carried out will be exemplified.

Figure 8B:
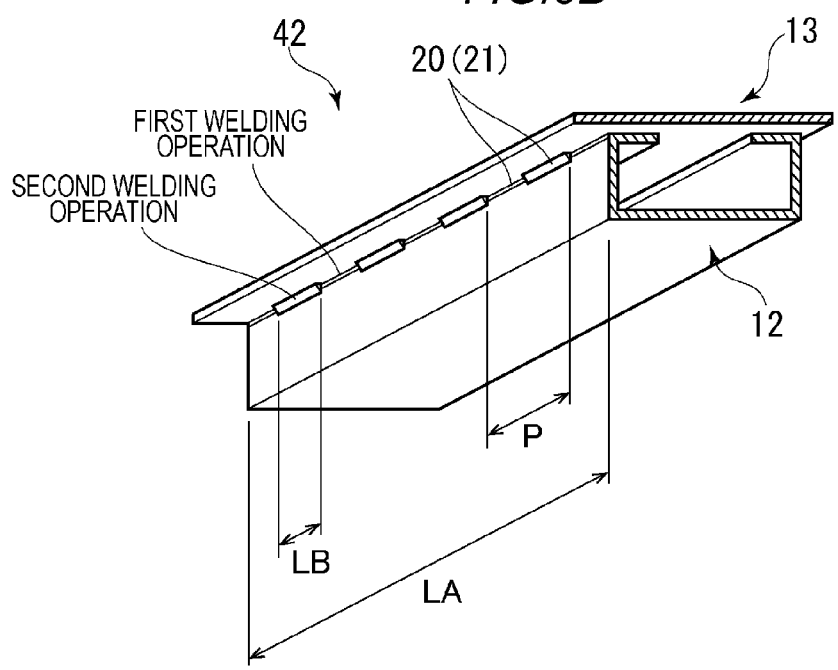
FIG. 8B is a perspective view showing an example of an automobile structural member in which a welding length is changed in correspondence with the number of welding operations.

FIG. 8B is a perspective view showing an example of an automobile structural member 42 in which the welding length is changed in correspondence with the number of welding operations. In the automobile structural member 42 shown in FIG. 8B, the welding length in the first welding operation is LA being an entire length of the first composing member 12, the welding length in the second welding operation is LB, and the welding pitch is P.

Here, automobile composing members whose welding lengths are changed in correspondence with the number of welding operations are fabricated and maximum bending loads are compared. Here, an automobile structural member 33 shown in FIG. 3C is fabricated by using a 440 MPa class non-plated steel sheet with a plate thickness of 2.0 mm, with an entire length of the first composing member 12 being 600 mm, a height H being 60 mm, a curvature radius R of a bent portion 12b being 10 mm, while the welding length of the first welding operation and the welding length of the second welding operation are changed. Note that welding conditions for both the first welding operation and the second welding operation are the same as the welding condition in arc welding of Table 1 except the welding length LB and the welding pitch P.

A bending performance of each of fabricated automobile structural members 33 is evaluated by a static three-point bending test. A test condition is similar to the test condition of Table 1.

Table 4 shows test results of maximum bending tests.

TABLE 4

| Plate Thickness t (mm) | Welding Method | Welding Length LB of First Operation LB (mm) | Welding Pitch P of First Operation P (mm) | Welding Length LB of Second Operation LB (mm) | Welding Pitch P of Second Operation P (mm) | Maximum Bending Load (kN) | Classification |
|---|---|---|---|---|---|---|---|
| 2.0 | Arc Welding | 600 | — | 600 | — | 47.5 | Fourth Invention Example |
| | | 600 | — | 50 | 50 | 45 | Fifth Invention Example |

The fourth invention example and the fifth invention example shown in Table 4, when positions to which the second welding operations are applied are compared, each have the same load transmission portion width WT and the same joining width L. Further, in the fourth invention example, since the welding length LB is the same as the entire length of the first composing member 12 in each of the first operation and the second operation, columns for the welding pitch P are vacant.

As shown in Table 4, in the fifth invention example in which intermittent arc welding is carried out in the second operation, a maximum bending load is smaller by 5% than in the fourth invention example in which arc welding is carried out for the entire length in all the operations. Therefore, when the plurality of welding operations are carried out, intermittent welding in the second and later operation can reduce burn-through and influence of thermal strain, so that reduction of the maximum bending load can be suppressed.

For example, in the first operation, welding is carried out through the entire length so that the load transmission portion width WT satisfies 0<WT<0.3t (preferably 0<WT<0.6t) or so that the load transmission portion width WT satisfies WT<0.3t (preferably WT<0.63t) and the joining width L satisfies 0<L, and in the second operation (or second or later operation), welding is carried out to a welding length shorter than the entire length so as to satisfy 0.3t≤WT≤1.0t (preferably 0.6t≤WT≤1.0t), whereby it is possible to suppress reduction of the maximum bending load and to curtail an amount of filler metal.

Hereinabove, though the present invention has been described together with the aforementioned embodiments, the present invention is not limited only to those embodiments, and modification is possible within the scope of the present invention.

INDUSTRIAL APPLICABILITY

The present invention can be used for a member on which a three-point bending load is supposed to act at a collision accident, among automobile structural members used as skeletal frame members of an automobile vehicle body.

The invention claimed is:

1. An automobile structural member which has a closed transverse section shape constituted with at least a first composing member made of a molded body of a metal sheet and a second composing member made of a metal sheet or a molded body of a metal sheet and joined to the first composing member, the first composing member having a vertical wall portion, a bent portion connected to the vertical wall portion and bent toward an inner side of the closed transverse section shape, and an inward flange connected to the bent portion, the automobile structural member comprising:

a load transmission portion which is formed in at least a part of a region being a region between the bent portion and the second composing member and being a region of an extension of the vertical wall portion toward the second composing member, and which joins the bent portion and the second composing member.

2. The automobile structural member according to claim 1, wherein when a width of the load transmission portion toward a plate thickness direction of the vertical wall portion is indicated as WT and a plate thickness of the vertical wall portion is indicated as t $$0.3t \leq WT \leq 1.0t$$

is satisfied.

3. The automobile structural member according to claim 1, wherein the load transmission portion is a part of a joining portion filling a part or all of a space formed between the bent portion and the second composing member, and wherein in the joining portion a joining width being a range in contact with the second composing member is longer than a width of the load transmission portion.

4. The automobile structural member according to claim 1, wherein in the bent portion, hardness of at least a range which the load transmission portion is in contact with is higher than hardness of a base material of the first composing member.

5. The automobile structural member according to claim 1, wherein the load transmission portion is formed intermittently through a longitudinal direction of the automobile structural member.

6. A manufacturing method of an automobile structural member which has a closed transverse section shape constituted with at least a first composing member made of a molded body of a metal sheet and a second composing member made of a metal sheet or a molded body of a metal sheet and joined to the first composing member, the first composing member having a vertical wall portion, a bent portion connected to the vertical wall portion and bent toward an inner side of the closed transverse section shape, and an inward flange connected to the bent portion, the manufacturing method of the automobile structural member comprising:

forming a load transmission portion in at least a part of a region being a region between the bent portion and the second composing member, the region being an extension of the vertical wall portion toward the second composing member, and which joins the bent portion and the second composing member by welding using a filler metal.

7. The manufacturing method of the automobile structural member according to claim 6, wherein the load transmission portion is formed by a plurality of welding operations by using the filler metal.

8. The manufacturing method of the automobile structural member according to claim 7, wherein welding lengths are each different in at least two operations of the plurality of welding operations.

9. The manufacturing method of the automobile structural member according to claim 6, wherein the load transmission portion is a part of a joining portion filling a part or all of a space formed between the bent portion and the second composing member, wherein the load transmission portion is formed by a plurality of welding operations by using the filler metal, and wherein in the first welding operation, welding is carried out so that a width WT of the load transmission portion satisfies WT<0.6t and a joining width L being a range in which the joining portion is in contact with the second composing member satisfies 0<L, and wherein in the second or later welding operation, welding is carried out so that the width WT of the load transmission portion satisfies 0.6t≤WT≤1.0t.

10. The manufacturing method of the automobile structural member according to claim 6, wherein the load transmission portion is formed intermittently through a longitudinal direction of the automobile structural member.

11. The manufacturing method of the automobile structural member according to claim 6, wherein the load transmission portion is formed by arc welding or laser-arc hybrid welding by using the filler metal.

* * * * *